(12) United States Patent
Holar et al.

(10) Patent No.: US 8,181,238 B2
(45) Date of Patent: May 15, 2012

(54) SYSTEMS AND/OR METHODS FOR STREAMING REVERSE HTTP GATEWAY, AND NETWORK INCLUDING THE SAME

(75) Inventors: Elliot Holar, Arlington, VA (US); Walter B. Lake, Gaithersburg, MD (US)

(73) Assignee: Software AG, Darmstadt (DE)

( * ) Notice: Subject to any disclaimer, the term of this patent is extended or adjusted under 35 U.S.C. 154(b) by 931 days.

(21) Appl. No.: 11/896,313

(22) Filed: Aug. 30, 2007

(65) Prior Publication Data

US 2009/0064307 A1 Mar. 5, 2009

(51) Int. Cl.
*H04L 29/06* (2006.01)
*H04L 9/32* (2006.01)
*G06F 15/173* (2006.01)
*G06F 15/16* (2006.01)

(52) U.S. Cl. .......... 726/12; 709/225; 709/227; 713/168; 726/10

(58) Field of Classification Search ........................ None
See application file for complete search history.

(56) References Cited

U.S. PATENT DOCUMENTS

| | | | |
|---|---|---|---|
| 7,661,129 B2 * | 2/2010 | Panasyuk et al. | 726/10 |
| 2002/0116248 A1 | 8/2002 | Amit et al. | |
| 2003/0097457 A1 | 5/2003 | Saran et al. | |
| 2005/0076126 A1 * | 4/2005 | Knight et al. | 709/227 |
| 2005/0154886 A1 * | 7/2005 | Birk et al. | 713/168 |
| 2005/0262357 A1 | 11/2005 | Araujo et al. | |
| 2006/0248189 A1 * | 11/2006 | Jerrard-Dunne et al. | 709/225 |
| 2009/0064307 A1 * | 3/2009 | Holar et al. | 726/12 |

FOREIGN PATENT DOCUMENTS

EP 1 528 710 5/2005

OTHER PUBLICATIONS

"Java Message Service API Tutorial", Kim Haase, Sun Microsystems, Inc., Aug. 2001, pp. 1-278.
"Guarantee Inter-Enterprise Message Delivery Using JMS", Gopalan Suresh Raj, Java Report, SIGS Publications, New York, vol. 5, No. 8, Aug. 2000.
"JMS and CORBS Notification Interworking", Steve Trythall, Internet Citation, Dec. 12, 2001.

* cited by examiner

*Primary Examiner* — Nathan Flynn
*Assistant Examiner* — Trang Doan
(74) *Attorney, Agent, or Firm* — Nixon & Vanderhye PC (57) ABSTRACT

In certain example embodiments of this invention, there is provided systems and/or methods for a streaming reverse HTTP gateway, and/or networks including the same. In such a network, a reverse HTTP gateway is located within a demilitarized zone (DMZ) disposed between public (or external) and private (or internal) networks for providing security therebetween. Requests from external clients may be streamed from the external network to the internal network over various connections and ports, including a substantially persistent reverse connection between an internal server and a reverse HTTP gateway. The reverse HTTP gateway architecture of certain example embodiments removes the need for proprietary protocols implemented between the reverse HTTP gateway located in the DMZ and the internal server located in the internal network. In certain example embodiments, the reverse HTTP gateway architecture is configured to leverage the capabilities of HTTP 1.1.

32 Claims, 5 Drawing Sheets

SYSTEMS AND/OR METHODS FOR STREAMING REVERSE HTTP GATEWAY, AND NETWORK INCLUDING THE SAME

FIELD OF THE INVENTION

The example embodiments disclosed herein relate to networks and, more particularly, to networks including a reverse HTTP gateway located within a demilitarized zone (DMZ) disposed between public (or external) and private (or internal) networks for providing security therebetween. Requests from external clients may be streamed from the external network to the internal network over various connections, including a substantially persistent reverse connection between an internal server and a reverse HTTP gateway. The reverse HTTP gateway architecture of certain example embodiments removes the need for proprietary protocols implemented between the reverse HTTP gateway located in the DMZ and the internal server located in the internal network.

BACKGROUND AND SUMMARY OF EXAMPLE EMBODIMENTS OF THE INVENTION

The need for security in a networked environment is well-known. To provide security, software and/or hardware firewalls have been implemented to permit, deny, and/or proxy data between client(s) and server(s) at specified levels of trust. Further refinements have included implementing multiple firewalls to create a demilitarized zone (DMZ) between public and private networks. A DMZ generally refers to a portion of a company's network that is protected from the Internet by a firewall, includes one or more servers, and protects the internal network against attacks that are blocked by another firewall. Virtually all companies make use of DMZs. Network traffic ordinarily moves from the Internet through an "outer" firewall into the DMZ where it is processed by one or more servers. It then moves through the "inner" firewall to the inside server where the sensitive operation or data is handled.

Network operators have wanted to accommodate incoming SOAP (Simple Object Access Protocol, which refers to a simple XML-based protocol for enabling applications to exchange information over HTTP), EDI (Electronic Data Interchange, commonly used for enabling electronic commerce), and/or other requests (e.g., from the Internet). In particular, they have wanted to allow such incoming requests to go through their DMZs and into their internal networks, but without allowing any direct connections from the DMZ to the internal network.

One solution for accommodating such requests has involved creating an inbound "hole" in the firewall, which still involves a direct connection as above. However, the disadvantages of this design approach are readily apparent and well-known in the art. Also, it will be appreciated that a tunneling approach often introduces undesirable performance overhead and large document processing limitations, in addition to security vulnerabilities.

Another solution provided by the assignee of the instant invention has involved configuring a reverse invoke server for use within the DMZ. By way of analogy, this approach is similar to a situation in which a first person walks up to a second person's house and wants to go in the door, but the first person is not allowed to knock on the door, ring the doorbell, or use the telephone to call inside and ask for the door to be opened. The reverse invoke solution in this analogy is to have the second person who lives in the house occasionally look out the window. If the second person sees someone standing there, that person is let in.

For network traffic, the idea is generally the same. That is, a reverse invoke server located in a DMZ would be periodically or substantially continuously "polled" for work to do (e.g., there is a number of user-configured connections waiting for incoming requests). The solution also is similar to polling where the lookout person is waiting for an indeterminate group of people (e.g., akin to a large message), so that the person waiting has to wait for the last person to arrive (e.g., for the large message to be fully buffered in a storage location) before being able to let that group enter (e.g., to communicate the message to the internal server). This solution is advantageous for a number of reasons. For example, even if someone successfully figures out a way to gain control of the server in the DMZ, that person still could not gain access to the server in the internal network.

However, further enhancements to this basic technique are still possible. Currently, the communication protocols in place before and after the DMZ are different. This configuration adds complexity to the network and tends to require the implementation of at least one proprietary protocol (e.g., between the DMZ and the internal server). Therefore, the entire input message has to be stored at least temporarily (e.g., in memory) in the DMZ Server, e.g., pending protocol and/or data conversion. This configuration also places a limit on the size of message, for example, because the computational resources located within the DMZ may be limited. It also introduces disadvantageous delays. A message essentially is buffered within the DMZ before being passed to the internal server. Also, there is an inherent lag between the successive polls of the reverse invoke server.

Thus, it will be appreciated that there is a need in the art for systems and/or methods that overcome one or more of these and/or other disadvantages. It also will be appreciated that there is a need in the art for improvements to the basic reverse invoke architecture.

An example aspect of certain example embodiments of this invention relates to a streaming reverse HTTP gateway network architecture.

Another example aspect of certain example embodiments relates to accommodating communications over the same protocol before and after the DMZ. By way of example and without limitation, this protocol may be HTTP and, in certain parts of the network, the protocol may be HTTP 1.1. Although a particular version and implementation of the protocol is provided, it will be appreciated that the present invention is not limited thereto, nor is any particular example embodiment limited to a particular version and implementation of a protocol throughout all portions of the network. For example, the protocol implemented may be one or more versions of HTTP and/or HTTPS (e.g., HTTP over SSL) in one or more parts of the network.

Still another example embodiment relates to the maintenance of a substantially persistent reverse connection between an internal server and a reverse HTTP gateway in a DMZ.

In certain example embodiments of this invention, a network is provided. An external firewall and an internal firewall define a DMZ therebetween. An internal network is located behind the internal firewall. An external network is located in front of the external firewall. At least one internal server is connected to the internal network. Each said internal server includes at least one internal registration port. At least one reverse HTTP gateway is located in the DMZ. Each said reverse HTTP gateway includes a reverse proxy port configured to communicate with a client on the external network, and a proxy registration port configured to communicate with one or more internal registration ports of the at least one internal server over a substantially persistent reverse connection between the respective reverse HTTP gateway and the respective internal server. A common communication protocol is implemented on both sides of the DMZ. Any messages between a client on the external network and the at least one internal server are substantially directly streamed therebetween.

In certain other example embodiments, there is provided an HTTP gateway for use in a DMZ located between an external firewall and an internal firewall of a network, with the network including a private network and a public network. A reverse proxy port is configured to communicate with a client on the public network. A proxy registration port is configured to communicate with one or more internal registration ports of at least one internal server provided to the private network over a substantially persistent reverse connection between the HTTP gateway and the respective internal server. A common communication protocol is implemented on both sides of the DMZ. Any messages between a client on the public network and the at least one internal server are substantially directly streamed therebetween.

According to certain example embodiments, a method of configuring a network is provided. An external firewall and an internal firewall are provided so as to define a DMZ therebetween, with an internal network being located behind the internal firewall and an external network being located in front of the external firewall. At least one internal server is connected to the network. Each said internal server includes at least one internal registration port. At least one reverse HTTP gateway is located within the DMZ. Each said reverse HTTP gateway includes a reverse proxy port configured to communicate with a client on the external network, and a proxy registration port configured to communicate with one or more internal registration ports of the at least one internal server over a substantially persistent reverse connection between the respective reverse HTTP gateway and the respective internal server. A common communication protocol is implemented on both sides of the DMZ. Any messages communicated between a client on the external network and the at least one internal server are substantially directly streamed therebetween.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

In general, reverse invoke is a feature that allows requests coming in from the Internet to open a connection to a server in the DMZ, which then forwards the request to an internal server over a connection that was previously established from the internal server out to the DMZ server. As noted above, this arrangement generally obviates the requirement for having a "hole" in the internal firewall. The reverse invoke feature has been successfully implemented in connection with a proprietary network protocol.

However, certain example embodiments provide an alternative network protocol that implements a common, open protocol before and after the DMZ. In particular, in certain example embodiments, a special-purpose use of the HTTP 1.1 protocol involves using the protocol's direction switching for security purposes. This new use for HTTP 1.1 on both sides of the DMZ surprisingly and advantageously provides enhanced security features, allows messages to be streamed through the DMZ, substantially reduces message size limitations, and enables a substantially persistent reverse connection between the internal server and the reverse invoke server (which may now be thought of as a reverse HTTP gateway) that substantially avoids delays (e.g., those typical in a current polling solution). Although a particular version of the protocol is provided, it will be appreciated that the present invention is not limited thereto, nor is any particular example embodiment limited to a particular version of a protocol throughout all portions of the network.

Figure 1:
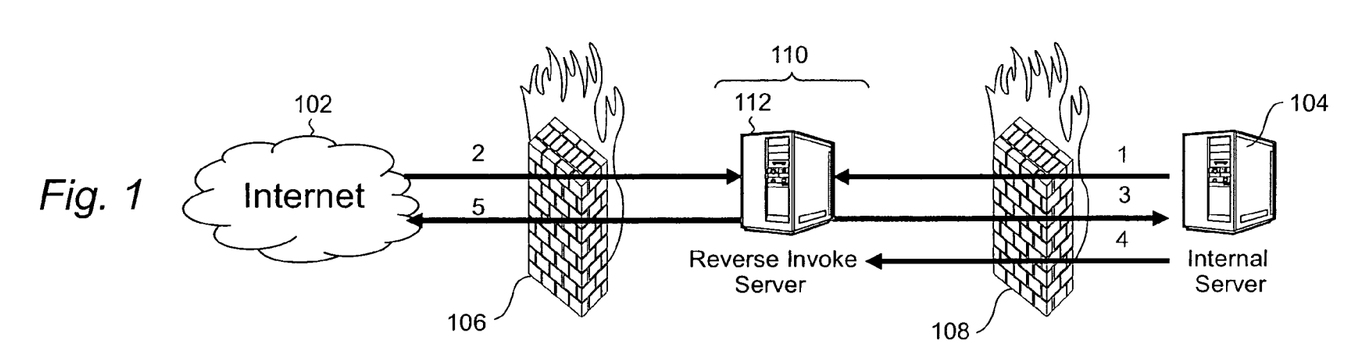
FIG. 1 is a schematic view of a typical reverse invoke architecture.

A description of a typical reverse invoke architecture will now be provided. FIG. 1 is a schematic view of a typical reverse invoke architecture. In FIG. 1, traffic from an external network (e.g., the Internet) 102 seeks to reach an internal server 104. An external firewall 106 and an internal firewall 108 define a DMZ 110.

To allow the internal server 104 to operate in environments where connections from the DMZ 110 to the internal network are prohibited, the internal server 104 may be configured to communicate with another internal server serving in a reverse invoke configuration. In such an architecture (e.g., as shown in FIG. 1), the internal server 104 remains behind the inner firewall 108, where external clients (e.g., devices on the external network 102) ideally cannot access it. Another internal server in placed in the DMZ 110 to act as a reverse invoke server 112. The reverse invoke server 112 acts as an intermediary between the Internet 102 and the internal server 104. All or substantially all user validation and transaction processing may be performed internally and/or in the DMZ 110.

In general, external clients send requests to the reverse invoke server 112 which, in turn, passes the requests to the internal server 104. After processing the requests, the internal server 104 sends the response to the reverse invoke server 112 which, in turn, passes them back to the external client.

In greater detail, still referring to FIG. 1, the internal server 104 opens a connection to the reverse invoke server 112 (line 1). An external device (e.g., a trading partner) on the external network 102 sends a document to the reverse invoke server 112 (line 2). The reverse invoke server 112 forwards the document to the internal server 104 over the opened connection (line 3). The internal server 104 sends a response to the reverse invoke server 112 (line 4). The reverse invoke server 112 forwards the response back to the trading partner (line 5).

In this way, reverse invoke generally is a substitute for opening a port (e.g., a tunnel or hole) through the internal firewall 108 to allow a connection from the DMZ 110 to the internal network. For reverse invoke to work, the internal firewall 108 must still allow a connection (e.g., an outbound connection) from the internal server 104 to the DMZ 110. In certain example embodiments, a plurality of such connections from internal server 104 to the reverse invoke server 112 may be provided for sending traffic. By reducing the connections to only those established by the internal server 104, the reverse invoke architecture makes it more difficult for an attacker to directly penetrate the internal network, even if the attacker subverts a system in the DMZ 110.

In addition to passing requests from and to the external clients, the reverse invoke server 112 also may be used to perform user-defined functions before passing requests to the internal server 104. For example, a package deployed on the reverse invoke server 112 may be configured to perform XML validation.

A typical reverse invoke server is transparent to the client and, unlike some third-party proxy servers, requires no modifications to the client.

Reverse invoke supports, or can be configured to support, nearly all requests that a regular internal server handles such as, for example, guaranteed delivery. Also, filtering, including IP address and/or domain filtering, may be performed in the DMZ 112, and per-service filtering may be performed by the internal network. Such filtering may help keep malicious documents out of the internal network.

In certain example embodiments, the inner firewall 108 may be configured to deny all inbound connections, e.g., to provide for increased security.

Figure 2:
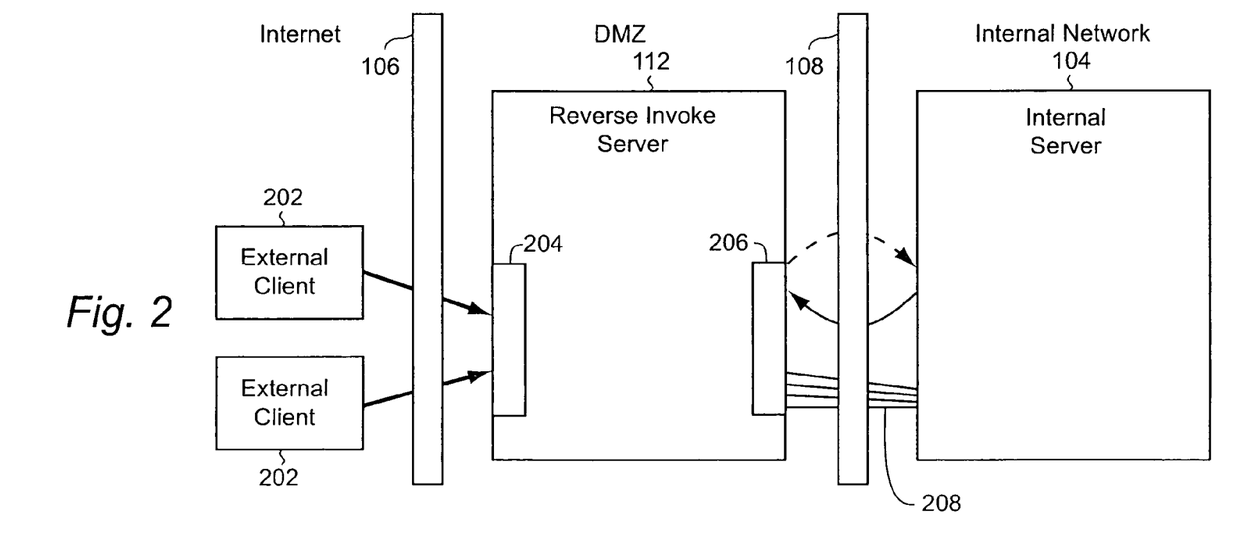
FIG. 2 is a more detailed view of the reverse invoke architecture of FIG. 1, showing the incorporation of proxy and registration ports in the reverse invoke server.

FIG. 2 is a more detailed view of the reverse invoke architecture of FIG. 1, showing the incorporation of proxy and registration ports in the reverse invoke server. For an ordinary internal server to function as a reverse invoke server 112, it generally must have a reverse proxy port 204 (e.g., an HTTP or HTTPS reverse proxy port) to listen for requests from external clients (e.g., partners) 202 and a registration port 206 (also sometimes called a reverse registration port) through which it maintains its connection 208 to the internal server 104. As noted above, for security purposes, the internal server 104 initiates the connections to the reverse invoke server 112.

A description of the typical firewall rules for reverse invoke architectures will now be provided. With respect to the outer firewall 106, inbound connections optionally may be restricted to source addresses of known trading partners coming in over any port. Also for the inbound connections, the destination address is the reverse invoke server 112 and the port is the proxy port 204. For the outbound connections, the source address will be the reverse invoke server 112, coming from any port. Optionally, the destination address may be restricted to trading partners and, also optionally, the port may be restricted to the port number of the trading partner's internal server. Outbound connections may be limited to established connections only.

With respect to the inbound connections of the inner firewall 108, the source address is the reverse invoke server 112 going out over any port. The destination address is the internal server 104, again going out over any port. Inbound connections may be limited to established connections only. For outbound connections, the source address will be the internal server 104 over any port. The destination address will be the reverse invoke server 112, and the port will be the registration port 206.

Currently, the internal server 104 uses a proprietary, asynchronous communication protocol to connect to the reverse invoke server 112. This special protocol uses two transports: SOCK, which is unencrypted and uses plain TCP sockets, and SSLSOCK, which is encrypted and uses SSL sockets. These connections 208 generally are substantially persistent (e.g., as close to persistent as possible). Thus, there is a protocol change from the DMZ 112 to the internal network. This proprietary protocol from DMZ 112 to the internal network often is less likely to be known by attackers.

When selecting a connection to the internal server 104, the reverse invoke server 112 selects registered connections in a round robin manner, provided that they satisfy the threshold criteria. In particular, the reverse invoke server 112 selects the next connection that does not exceed a predefined threshold for the number of pending requests.

Still referring to FIG. 2, the following summarizes how an external client request is handled in a reverse invoke scenario. The external client 202 sends a request to the reverse invoke server 112. Optionally, the reverse invoke server 112 performs additional processing such as, for example, user-defined XML validation. The reverse invoke server 112 converts the request to a message and sends it to the internal server 104 on the previously-established connection between the reverse invoke server 112 and the internal server 104. The internal server 104 processes the request, and then sends a response to the reverse invoke server 112. The reverse invoke server 112 sends a response to the external client 202.

Figure 3:
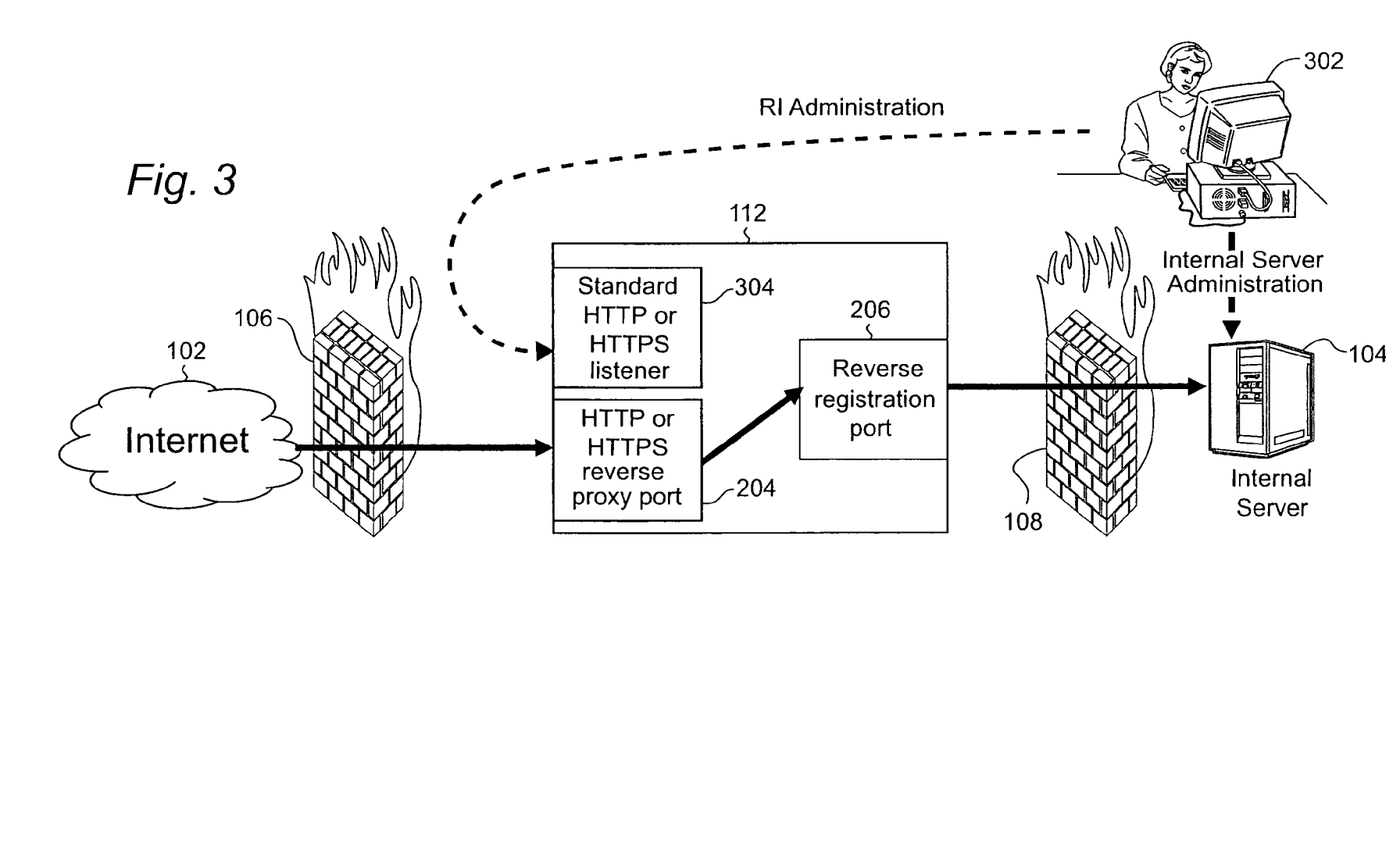
FIG. 3 is a schematic view of an authorized administrator performing administrative functions to the reverse invoke server and the internal server in a reverse invoke architecture.

FIG. 3 is a schematic view of an authorized administrator 302 performing administrative functions on the reverse invoke server 112 and the internal server 104 in a reverse invoke architecture. A standard HTTP or HTTPS listener 304 may enable the administrator 302 to administer the reverse invoke server 112. Thus, the administrator may be located remote from one or both of the reverse invoke server 112 and the internal server 104.

Accordingly, it would be desirable to allow authorized administrators 302 to administer the reverse invoke server 112 and/or the internal server 104 while also protecting these servers from unauthorized attempted accessions to the administrative modules in communication therewith. To provide protection to the reverse invoke server 112 and the internal server 104, separate ports are provided to each for administration. By way of example and without limitation, the reverse invoke registration port 206 may communicate with the internal server 104 over port 1111, the external clients sitting on the external network 102 may communicate with the HTTP or HTTPS reverse proxy port 204 over port 443, and the administrator 302 may communicate with the reverse invoke server 112 through its standard HTTP or HTTPS listener 304 over port 5555.

Additionally, IP address and/or domain restrictions may be used in connection with a separate port approach to protect the network components. It also will be appreciated that the external firewall 106 provides an additional and somewhat inherent form of protection to the network components.

Figure 4:
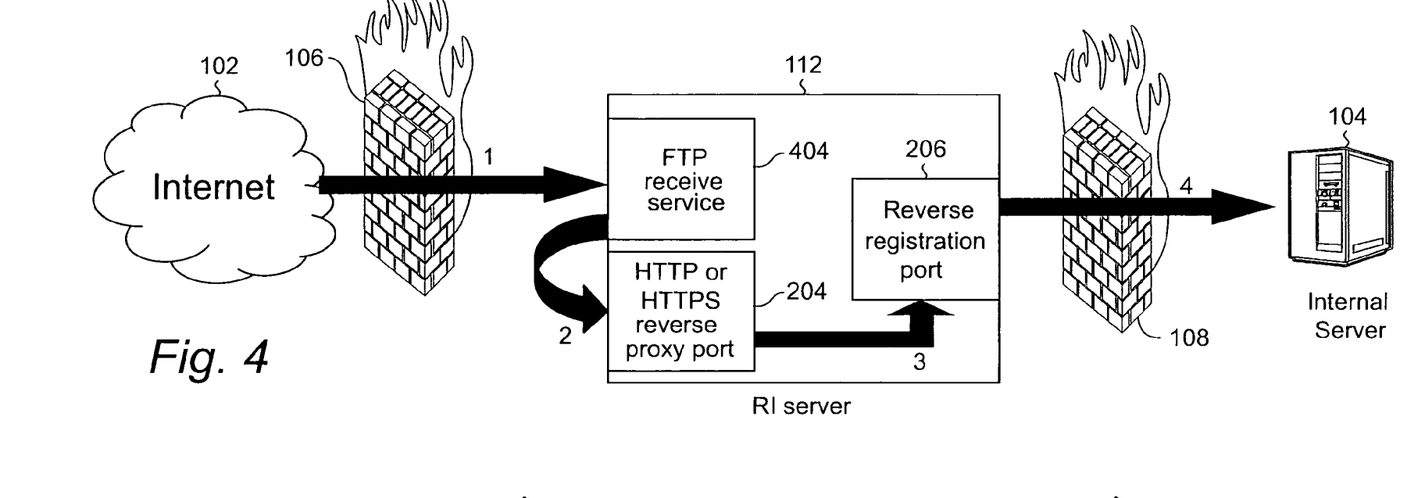
FIG. 4 is a schematic view of a reverse invoke architecture modified to accommodate additional communication protocols.

As noted above, reverse invoke supports, or can be configured to support, nearly all requests that a regular internal server handles. For example, FIG. 4 is a schematic view of a reverse invoke architecture modified to accommodate additional communication protocols. In particular, FIG. 4 shows a reverse invoke architecture cooperating with an FTP service. Although an FTP service is shown and described in connection with FIG. 4, other services such as SMTP may be provided in similar ways in other example implementations. To use FTP, a service that receives the request may be created. Thus, FTP receive service 404 is provided to reverse invoke server 112. After the FTP receive service 404 receives the message from the external network 102, the message may be resubmitted to the HTTP or HTTPS reverse proxy port 204 (or a suitably configured HTTP or HTTPS listener) on the same server. In such cases, it is advantageous to configure the HTTP or HTTPS reverse proxy port proxy 204 (or HTTP or HTTPS listener) for localhost only, e.g., to provide security (including, for example, reducing the chances of unauthorized external clients gaining access to the reverse invoke server 112). After the message is resubmitted to the HTTP or HTTPS reverse proxy port 204 (or the suitably configured HTTP or HTTPS listener), it is forwarded to the reverse registration port 206 as normal.

Figure 5:
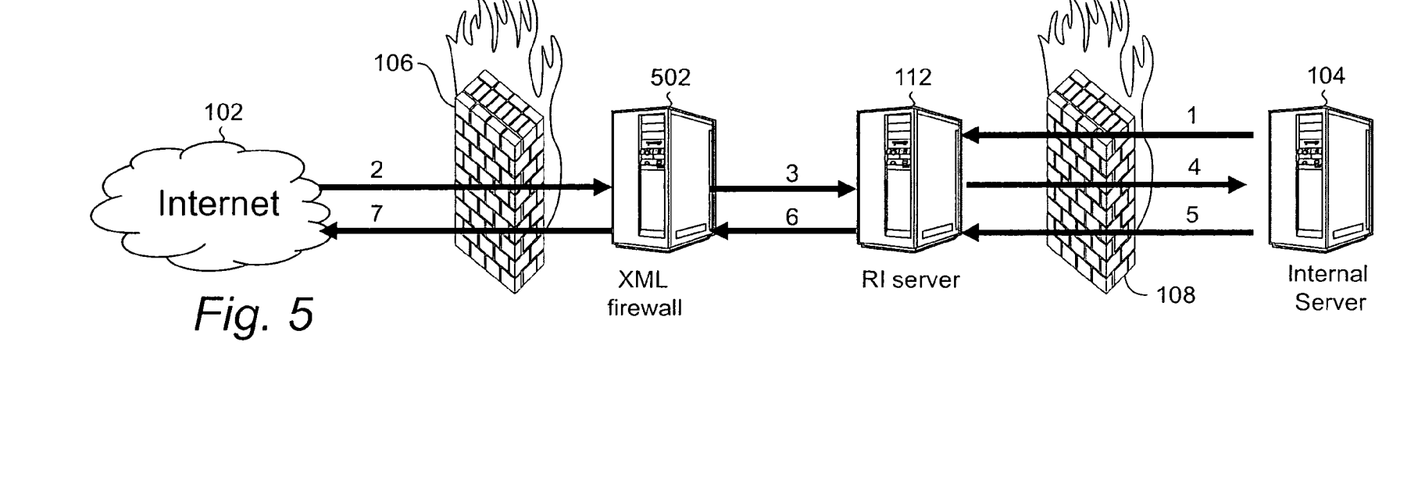
FIG. 5 is a schematic view of a hybrid reverse invoke architecture including multiple firewalls.

FIG. 5 is a schematic view of a hybrid reverse invoke architecture including multiple firewalls. FIG. 5 is similar to FIG. 1, except that an additional XML firewall 502 is introduced into the architecture proximate to the outer firewall 106. In certain example embodiments, the XML firewall 502 may even replace the outer firewall 106. The XML firewall 502 may be implemented as hardware, software, firmware, or any suitable combination of programmed logic circuitry.

In FIG. 5, the internal server 104 opens a connection to the reverse invoke server 112 (line 1). A trading partner connected to the external network 102 sends a document to the XML firewall 502 (optionally across outer firewall 106, in cases where it is included in the implemented architecture) (line 2). The XML firewall 502 forwards the document to the reverse invoke server 112 (line 3). The reverse invoke server 112 forwards the document to the internal server 104 over the opened connection (line 4). The internal server 104 sends a response to the reverse invoke server 112 (line 5). The reverse invoke server 112 forwards the response to the XML firewall 502 (line 6). The XML firewall 502 sends the response back to the trading partner (line 7). Thus, it is possible to implement hybrid architectures in connection with general reverse invoke techniques.

Figure 6:
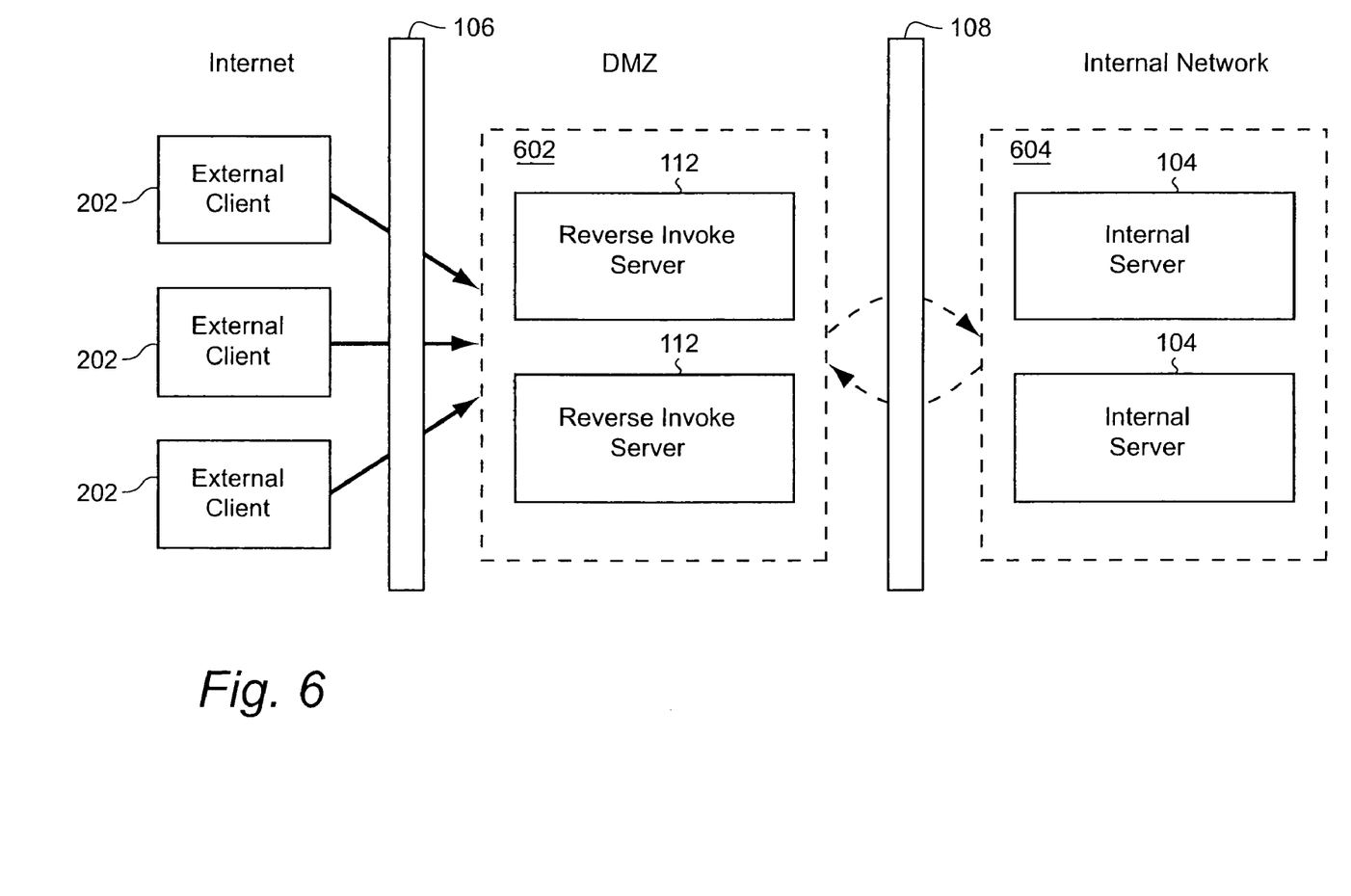
FIG. 6 is a schematic view of a reverse invoke architecture modified to accommodate clustering; and, FIG. 7 is a schematic view of a reverse HTTP gateway architecture in accordance with an example embodiment.

Also, clustering techniques may be used in connection with a reverse invoke architecture. Thus, FIG. 6 is a schematic view of a reverse invoke architecture modified to accommodate clustering. Multiple reverse invoke servers 112 may be provided, and they may be load-balanced (e.g., using a load balance, not shown), within a cluster 602. In addition, multiple internal servers 104 may be clustered (e.g., into an internal network cluster 604) to improve availability, reliability, and/or scalability. The reverse invoke servers 112 may be set up as a true cluster, or as a pseudo-cluster, of reverse invoke servers. To set up a pseudo-cluster, a list of hosts to be in the pseudo cluster should be defined. This allows for failover support similar to as in a real cluster.

A reverse invoke configuration offers a number of advantages over traditional third-party proxy servers. For example, reverse invoke may use persistent SSL socket connections. These connections reduce (and sometimes even eliminate) the huge overhead of establishing SSL connections, while providing the benefits of encryption. Also, with reverse invoke, it is possible to configure an inner firewall to deny all inbound connections, thereby substantially isolating the internal server from the DMZ. Enabling reverse invoke requires no corresponding changes to the external client. Additionally, if desired, it also is possible to perform additional processing such as, for example, user-defined XML validation, on the reverse invoke server before sending the request to the internal server.

A reverse invoke server can handle both HTTP and HTTPS requests. Typically, third-party proxy servers can handle only one or the other. Thus, because reverse invoke configurations often support both HTTP and HTTPS protocols, various forms of authentication can be provided in connection therewith. For example, username/password authentication may be provided over HTTP or HTTPS. If such authentication is implemented in a reverse invoke server, validation is performed and passed along as "approved." If such authentication is implemented in an internal server, a message may be passed along for validation.

Alternatively, or in addition, certificate-based authentication may be implemented over HTTPS. If such authentication is implemented in a reverse invoke server, the validation is performed by mapping a certificate to a user and passing it along as "approved." If such authentication is implemented in an internal server, the reverse invoke server examines the proof of the matching private key, the certificate validity interval, and whether the certificate is signed by a trusted certificate authority. The Reverse invoke server may pass the certificate to internal server over the SOCK/SSLSOCK connection, and the internal server may then map the certificate to a user ID or reject it. Generally, the reverse invoke server and the internal server will have identical trusted authority definitions. In certain example embodiments, authentication will always be performed on the internal server and further authentication may be performed in the reverse invoke server for an optional extra level of security in connection with such example embodiments.

Additional details pertaining to the optional setup and configuration of a reverse invoke server are omitted. However, they may be found in, for example, the webMethods Integration Server Administrator's Guide, the entire contents of which are hereby incorporated herein by reference. It will be appreciated that such configuration techniques are provided by way of example and without limitation. Furthermore, it will be appreciated that such example techniques correspond to the only product currently available that is known to enable the above-described reverse invoke architecture and corresponding features.

Even though these arrangements have been commercially successful, further enhancements are still possible. The communication protocols in place before and after the DMZ are different and, in particular, there is a proprietary link between the DMZ and the internal server. This adds complexity to the network and additional processing requirements before messages can be relayed. For example, the entire input message has to be held in memory in a server within the DMZ, thus placing a limit on the size of message and introducing delays. Because of the proprietary protocol, additional hardware, software, and/or other programmed logic circuitry typically is needed to accommodate non-HTTP requests. As described above, it is possible to include additional components to provide this functionality in some cases. However, it is somewhat cumbersome to introduce such additional components, at least in terms of cost and complexity in configuration and administration. Moreover, some services (e.g., JSP, SOAP, etc.) cannot be provided at all because there is no efficient and/or effective way to translate between the client-requested service and the proprietary protocol.

Unlike current reverse invoke techniques, HTTP is used as the protocol before and after DMZ in certain example embodiments. As noted above, HTTP is not currently used to establish the reverse invoke procedure with a DMZ. Instead, HTTP usually would be used to simultaneously establish the connection together with the request. The invention in certain example instances uses HTTP in an unusual way to first open the connection from the internal server and then in a second step enable the sending of the request from the DMZ side.

To remove the requirement for a proprietary protocol between the DMZ and the internal server, when the internal server first starts, it establishes a network connection to the reverse invoke server located in the DMZ using HTTP. When the reverse invoke server receives a request from the outside, it forwards it along to the internal server on the already-open connection, thus functioning like a reverse HTTP gateway.

Certain example embodiments use services provided by HTTP 1.1 in a unique and surprisingly advantageous way. Ordinarily, the HTTP protocol is used in the direction from the initiator of the network connection to the recipient. Thus, the connection normally would be used in a direction from the internal server to the reverse invoke server. In certain example embodiments, the "reverse invoke" usage of certain example embodiments causes the internal server to establish the network connection. Unlike conventional HTTP, however, the requests of certain example embodiments go from the reverse HTTP gateway to the internal server.

The following analogy is provided by way of illustration. It is possible to conceive of a phone system where a person who places a call can ask the recipient questions that the recipient can answer. In such a system, if the recipient wants to ask the call initiator a question, however, the recipient has to call the original initiator back and ask questions in a separate conversation. This scenario illustrates the normal operation of HTTP.

Certain example embodiments, however, use a novel and surprisingly advantageous implementation of HTTP. In such cases, one party places the phone call, but the other party asks the questions. The new behavior provided by certain example embodiments simply forwards requests and does not behave as a proxy. Thus, the "reverse invoke" architecture of certain example embodiments may be thought of instead as being a reverse "HTTP gateway."

Perhaps more surprisingly, no special measures are needed to enable this special usage beyond basic server configuration. This is because certain example embodiments provide a novel way of using HTTP 1.1 itself to provide a security mechanism. This usage of HTTP is surprising, at least in part, because security services have been provided via extra ancillary services running on servers, open protocols existing in addition to or in place of HTTP, and/or additional or replacement proprietary protocols. Certain example embodiments reduce (and in some cases eliminate) the need for ancillary services, additional open protocols, and/or replacement proprietary protocols, particularly between the reverse HTTP gateway in the DMZ and the internal server running on the internal network.

The removal of a proprietary protocol (and its corresponding replacement with HTTP 1.1) is advantageous and particularly needed. This is true as more and more customers are deploying systems with full HTTP 1.1 support, at least because the internal server can be made to interact with client systems as a full-fledged peer by providing full HTTP 1.1 support as well.

Significant performance increases are also possible. Replacing the proprietary reverse invoke protocol with HTTP 1.1 allows for large documents to be streamed substantially directly (e.g., as close to directly as possible) to the internal server. It is expected that large file transfers on the order of 1 GB in size or even larger may be supported, without any server in the DMZ (or elsewhere) holding any significant portion of this data in memory when forwarding it to the internal server. Thus, because the protocols will be the same on both sides of the DMZ, leveraging HTTP 1.1 allows substantially direct streaming of messages substantially without memory-based full message buffering while potentially significantly increasing the pass-thru rate.

Despite such significant technical changes and feature enhancements to the basic reverse invoke architecture, certain example embodiments retain some or all of the security features supported by conventional reverse invoke architectures. For example, the existing reverse invoke functionality of being able to authenticate users at the internal server is maintained. This includes basic authentication as well as certificate-based authentication.

Similarly, certain example embodiments provide continued support for Trading Networks (TN) (e.g., of the type commercially available from webMethods) and layered products that also provide support for the first time for other protocols. With respect to the former, a number of business-to-business (B2B) products (e.g., that use HTTP as the wire protocol) include TN receives and EDIINT, RNIF, and ebXML protocols (which are layered on top of TN), and may be supported by the reverse HTTP gateway architecture of certain example embodiments. With respect to the latter, for example, certain example embodiments provide support for JSP, SOAP, WS, and/or other invocations.

The following illustrative features of HTTP 1.1 help enable and/or provide further support for the reverse HTTP gateway architecture of certain example embodiments. First, in terms of standards compliance, there is substantially full compatibility with agents using prior HTTP versions (e.g., versions 0.9, 1.0, 1.1), as well as simplified multi-homed usage and conservation of IP addresses.

Second, with respect to port configuration, a suspend/resume capability is provided. There is also a delay capability, whereby a specify delay may be introduced to throttle the new connection acceptance rate. Unified HTTP/S configuration may be provided, as may a Per-Port Keep Alive feature (e.g., for allowing connection reuse). A Backlog Queue may be configured (e.g., while suspended) and, optionally, a private thread pool (similar to a Diagnostic port) may be provided.

Third, for remote server aliases, a Keep Alive feature for connection reuse may be provided, as may a service for configuring the maximum inactive connections to retain. Fourth, for the reverse HTTP gateway, the conventional HTTP tunneling protocol optionally may be completely replaced with direct HTTP-to-HTTP streaming, e.g., for large document support and increased performance. Also, new port configurations may be provided for the reverse "proxy" port (e.g., for client access), the reverse registration port (e.g., for access by the internal server), and/or the internal server registration port (e.g., for connection to the proxy).

The following use cases for the HTTP 1.1 feature help enable the reverse HTTP gateway features of certain example embodiments. Of course, it will be appreciated that other use cases and scenarios are possible. Also, it will be appreciated that the configurations, limitations, and steps specified below are provided by way of example only.

Use Case 1: Suspend HTTP Listener
    Actors: Admin, HTTP Client.
    Goal: Admin wants to suspend listening port.
    Preconditions: Admin has already defined an HTTP or HTTPS port. Listening port is not already suspended.
    Success: Listening port is suspended. Listener will not accept any more connections and dispatch any more requests.
    Main Scenario: Admin uses the administrator tool. For the HTTP Client, a request is made on the suspended listening port. If the backlog queue is enabled and is not full, the connection is queued. If the backlog queue is not enabled, the connection will be refused.
    Frequency: Initial port setup, Server Changes.
    Issues: If the port is deleted or disabled once suspended, queued connections will be released.

Figure 7:
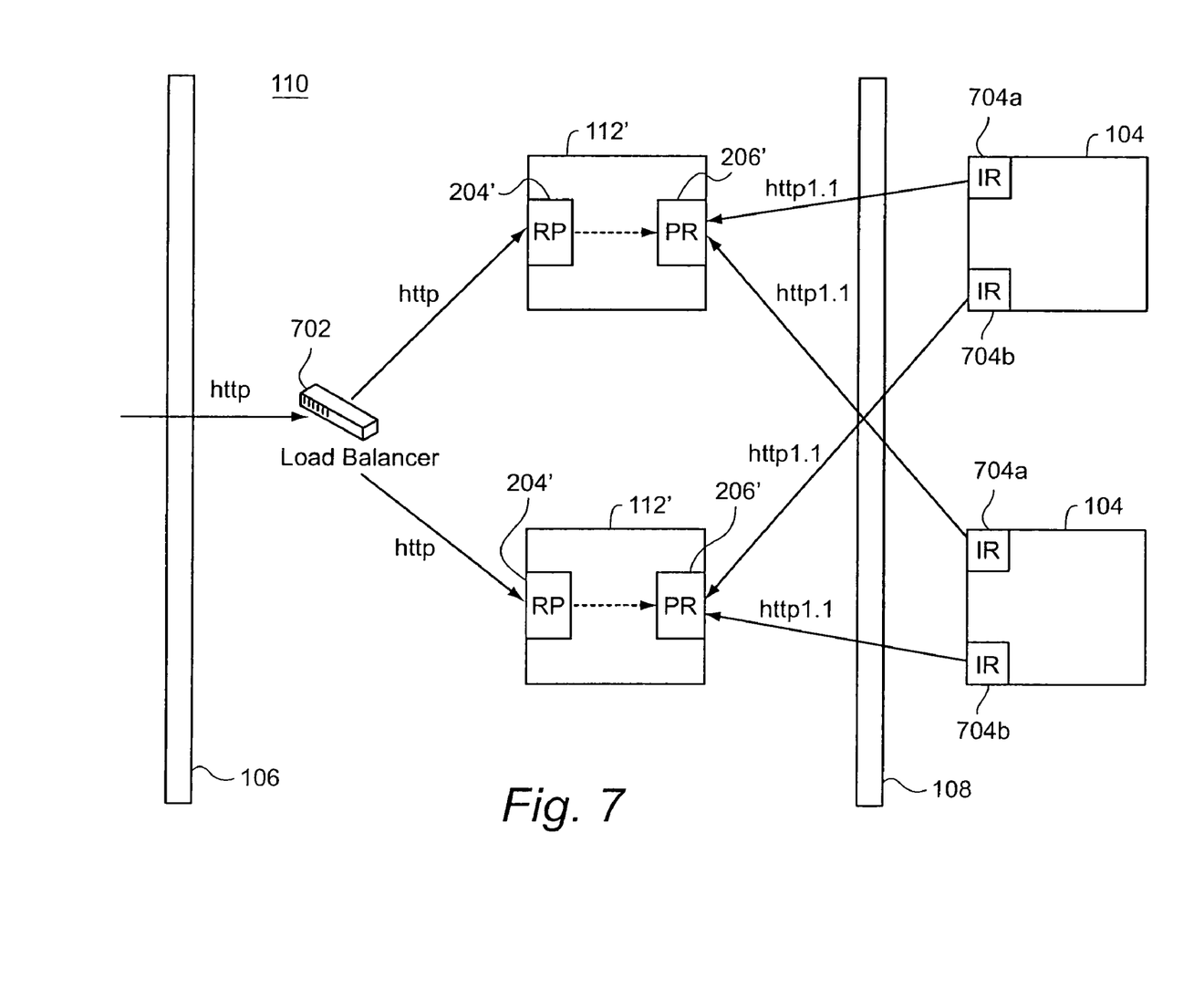

Use Case 2: Resume HTTP Listener
  Actors: Admin, HTTP Client.
  Goal: Admin wants to resume suspended listening port.
  Preconditions: Listening port is suspended.
  Success: Suspended listening port is resumed. Listener will resume accepting connections and dispatching requests.
  Main Scenario: Admin uses the administrator tool. For the HTTP Client, the Listener accepts the connection and dispatches the request.
  Frequency: Initial port setup.
Use Case 3: Setup HTTP Port Delay
  Actors: Admin, HTTP Client.
  Goal: Admin wants to increase the time that the listener will wait before accepting new client connection.
  Preconditions: Admin has already defined an HTTP or HTTPS port.
  Success: Listener will delay a new client connection for the specified amount of time.
  Main Scenario: Admin uses the administrator tool (e.g., to set a delay in any acceptable units, such as milliseconds, seconds, etc.). For the HTTP Client, the request is made on listening port. If the delay is specified and the time has not elapsed AND if the backlog queue is enabled and is not full, the connection is queued. If the delay is specified and time has not elapsed AND if the backlog queue is not enabled, the connection will be refused.
  Frequency: Based on runtime environment.
  Notes: The user can choose to throttle up or down the rate at which new connections are established.
Use Case 4: Setup private thread pool
  Actors: Admin, HTTP Client.
  Goal: Admin wants to configure a private thread pool for HTTP listener.
  Preconditions: Admin has already defined an HTTP or HTTPS port.
  Success: Private thread pool is used for dispatching new HTTP requests.
  Main Scenario: Admin uses the administrator tool (e.g., and optionally changes the threadpool min, max, and/or priority). For the HTTP Client, if the thread pool is not enabled, the listener will use the global thread pool. If it is enabled, the private thread pool is used.
  Frequency: Based on runtime environment.
  Notes: The threadpool priority is the JAVA thread priority and will affect the server. The threadpool min can not be greater than the threadpool max. Also the threadpool max can not be greater than 65,535.
  Issues: Should a request spawn additional service thread(s), these threads will be taken from the global pool, not the listener private pool.
Use Case 5: Configure new HTTP port parameters
  Actor: Admin.
  Goal: Admin wants to configure new port parameters such as private thread pool, bind address, backlog, and keep alive timeout.
  Preconditions: Admin has already defined an HTTP or HTTPS port.
  Success: Admin is able to successfully configure port parameters.
  Main Scenario: Admin uses the administrator to (1) select an HTTP port for editing, (2) specify a bind address (e.g., providing the ability to bind to a specific IP address on a machine), (3) specify a connection queue backlog (e.g., when the listener is suspended, this is the number of requests that are blocked before rejecting new connection requests), (4) specify a keep alive timeout, and (5) enable private thread pool and specify pool min, pool max, and thread priority.
  Frequency: Initial port setup.
Use Case 6: Configure advanced HTTP port settings
  Actor: Admin.
  Goal: Admin wants to configure advanced HTTP port settings such as being able to suspend or throttle listener connections.
  Preconditions: Admin has already defined an HTTP or HTTPS port.
  Success: Admin is able to successfully configure advanced port settings.
  Main Scenario: Admin uses the administrator tool to select an HTTP port for editing, suspending, throttling up/down the rate at which new connections are established, and/or increasing/decreasing the number of threads for the private threadpool.
  Frequency: Based on runtime environment.
Use Case 7: Setup HTTP gateway between two internal servers in the DMZ and secure layer
  Actor: Admin.
  Goal: Admin wants to setup an HTTP gateway between an internal server in the secure layer and an internal server in the DMZ.
  Success: Admin is able to successfully configure an HTTP gateway between these servers.
  Main Scenario: Admin uses the administrator tool on the DMZ server to (1) add a new HTTP or HTTPS port, (2) select reverse proxy (e.g., a port for inbound requests), (3) configure the port and specify the registration port needed to forward inbound requests, and also enable reverse proxy port, (4) add another HTTP or HTTPS port, (5) select proxy registration (e.g., a port for accepting connections from internal servers), and (6) configure this port and specify the proxy port for validating the reverse HTTP gateway configuration, and then enable the proxy registration port, (7) add an internal registration port, and (8) configure the port and specify proxy host and max connections and then enable internal registration port.
  Frequency: Initial HTTP gateway setup.
Use Case 8: Configure new remote server alias parameters
  Actor: Admin.
  Goal: Admin wants to configure new remote server alias parameters.
  Preconditions: Admin has previously defined a remote server alias.
  Success: Admin is able to successfully configure alias parameters.
  Main Scenario: Admin uses the administrator tool to specify the keep alive timeout and max number of client connections (e.g., that can be retained for reuse).
  Frequency: Initial remote server alias setup.
Use Case 9: Runtime HTTP gateway behavior
  Actor: Client system.
  Goal: Client system wants to send a document or invoke a service via HTTP to an internal server/TN server fronted by an internal server acting as a HTTP gateway.
  Preconditions: An HTTP gateway (e.g., as defined in use case 7) has been setup (e.g., as shown in FIG. 7 and described in greater detail below).
  Success: Client is able to successfully send a document or invoke a service on the internal server/TN server.

Main Scenario: (1) The client sends an HTTP 1.1 request to the load balancer, (2) the load balancer forwards first request to the first reverse HTTP gateway's reverse proxy port, (3) the first reverse HTTP gateway streams the request to either the first internal server or the second internal server, e.g., based on which server has the most number of available connections, (4) the client sends another HTTP request to the load balancer, (5) the load balancer forwards the second request to the second reverse HTTP gateway's reverse proxy port, (6) the second reverse HTTP gateway streams the second request to either the first internal server or the second internal server, e.g., based on which server has the most number of available connections.

Extensions: The client may send any HTTP request (e.g., an HTTP 1.0 request). The client request is not limited to any particular payload size (e.g., the payload size may be 10 K, 100 K, 1 MB, 10 MB, 100 MB, 1 GB, 5 GB, etc.).

Frequency: Very frequent.

Notes: Ensure that when sending large documents (e.g., either by an HTTP 1.0 or 1.1 client) the JVM (Java Virtual Machine) heap is not being maxed on the reverse HTTP gateway because the server should be streaming requests.

FIG. 7 is a schematic view of a reverse HTTP gateway architecture in accordance with an example embodiment. As in the conventional example, the area between the outer firewall 106 and the inner firewall 108 is a DMZ 110. Within the DMZ is a load balancer 702 configured to distribute requests received from the external network through the external firewall 106 to the reverse proxy port 204' of an appropriate reverse HTTP gateway 112'. These requests may be HTTP, JSP, SOAP, or other requests. The proxy registration ports 206' are configured to communicate over HTTP 1.1 with the internal registration ports 704a-b of the internal servers 104. The reverse HTTP gateway 112' receiving the request is configured to stream the request to the appropriate internal server 104. The determination of which internal server should receive the request may be based in part on the number of available connections, number of pending requests, and/or the like etc.

By way of example and without limitation, port numbers for the various ports will now be provided. The HTTP request originating from an external client may proceed over the standard HTTP port 80. Thus, the reverse proxy port 204' may be configured to handle requests on port 80, as well. By contrast, the proxy registration ports 206' and the internal registration ports 704a-b may be configured for non-standard HTTP ports, e.g., to make them less vulnerable to attack from an outsider. Thus, proxy registration ports 206' may communicate over ports 180 and/or 280. The internal registration ports 704a may communicate over port 180, and the internal registration ports 704b may communicate over port 280. By including multiple internal registration ports 704a-b, each operating on a different port, the requests from the reverse HTTP gateway 112' may be rotated appropriately, for example, to reduce network congestion, accommodate more streams simultaneously, etc.

Although multiple internal servers 104 and multiple reverse HTTP gateways 112' are shown in FIG. 7, it will be appreciated that the present invention is not limited to any particular number of internal servers 104 or reverse HTTP gateways 112'. For example, a single reverse HTTP gateway 112' may be used in connection with a single internal server 104, a cluster of internal servers 104, etc. Similarly, a single internal server 104 may be used in connection with a single reverse HTTP gateway 112', a cluster of reverse HTTP gateways 112', etc. Also, additional services for translating non-HTTP requests (e.g., as described above) may be provided for (or to) a reverse HTTP gateway.

The example embodiments disclosed herein may be used with any type of internal servers 104 including, for example, integration servers capable of executing Business Process Management (BPM) services and/or the like.

It will be appreciated that the example embodiments disclosed herein are not limited to a particular version or implementation of HTTP. For example, as used herein, the term HTTP may include HTTP, HTTPS (e.g., HTTP over SSL), etc. Also, it will be appreciated that in certain example embodiments, HTTP may be used externally and HTTPS may be used internally, or vice versa, or HTTP may be used both internally and externally, or HTTPS may be used both internally and externally.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A network, comprising:
    an external firewall and an internal firewall defining a DMZ therebetween;
    an internal network located behind the internal firewall;
    an external network located in front of the external firewall;
    at least one internal server connected to the internal network, each said internal server including at least one internal registration port; and,
    at least one reverse HTTP gateway located in the DMZ, each said reverse HTTP gateway including:
        a reverse proxy port configured to communicate with a client on the external network, and
        a proxy registration port configured to communicate with one or more of the internal registration ports of the at least one internal server over a substantially persistent reverse connection between the respective reverse HTTP gateway and the respective internal server,
    wherein a common communication protocol is set to be used for communications between a client and the at least one internal server through the at least one reverse HTTP gateway, the common communication protocol being a standardized HTTP and/or HTTPS protocol, and
    wherein a message that is to be sent between a client on the external network and the at least one internal server is to be sent through the at least one reverse HTTP gateway via the common communication protocol, the message that is to be sent being substantially directly streamed between the client and the at least one internal server.

2. The network of claim 1, wherein the network is configured to substantially directly stream the message between the client on the external network and the at least one internal server free from separate client configuration.

3. The network of claim 1, wherein communications between the at least one reverse HTTP gateway and the at least one internal server are processed using HTTP 1.1.

4. The network of claim 1, wherein the at least one reverse HTTP gateway is configured to accommodate SOAP and/or JSP requests.

5. The network of claim 1, further comprising a cluster of reverse HTTP gateways and a cluster of internal servers.

6. The network of claim 5, further comprising a load balancer located within the DMZ configured to distribute messages to the reverse HTTP gateways,
  wherein each said reverse HTTP gateway is configured to selectively distribute messages to the cluster of internal servers.

7. The network of claim 6, wherein the messages are distributed in dependence on a number of available connections corresponding to each of the internal servers in the cluster of internal servers and/or in dependence on a round-robin distribution of messages.

8. The network of claim 1, wherein the at least one reverse server and/or the at least one internal server are further configured to perform username/password authentication and/or certificate-based authentication.

9. The network of claim 1, wherein an additional service is provided for the at least one reverse HTTP gateway to accommodate communication via one or more additional protocols.

10. An HTTP gateway for use in a DMZ located between an external firewall and an internal firewall of a network, the network including a private network and a public network, the HTTP gateway comprising:
  a reverse proxy port configured to communicate with a client on the public network; and
  a proxy registration port configured to communicate with one or more internal registration ports of at least one internal server provided to the private network over a substantially persistent reverse connection between the HTTP gateway and the respective internal server,
  wherein a common communication protocol is used through the HTTP gateway, and between a client and the private network, the common communication protocol being a HTTP and/or HTTPS protocol, and
  wherein data transferred between a client on the public network and the at least one internal server is substantially directly streamable therebetween, the data being transferable through the substantially persistent reverse connection and through the HTTP gateway via the common communication protocol.

11. The HTTP gateway of claim 10, wherein communications between the HTTP gateway and the at least one internal server are processed using HTTP 1.1.

12. The HTTP gateway of claim 10, wherein the HTTP gateway is configured to accommodate SOAP and/or JSP requests.

13. The HTTP gateway of claim 10, wherein further comprising a cluster of internal servers.

14. The HTTP gateway of claim 10, wherein the HTTP gateway and/or the at least one internal server are further configured to perform username/password authentication and/or certificate-based authentication.

15. The HTTP gateway of claim 10, further comprising an additional service to accommodate communication via one or more additional protocols.

16. A cluster of at least two of the HTTP gateways of claim 10, comprising:
  a load balancer located within the DMZ configured to distribute messages to the HTTP gateways,
  wherein each said HTTP gateway is configured to selectively distribute messages to a cluster of internal servers.

17. The cluster of claim 16, wherein the messages are distributed in dependence on a number of available connections corresponding to each of the internal servers in the cluster of internal servers and/or in dependence on a round-robin distribution of messages.

18. A method of configuring a network, the method comprising:
  providing an external firewall and an internal firewall so as to define a DMZ therebetween, an internal network being located behind the internal firewall and an external network being located in front of the external firewall;
  connecting to the network at least one internal server, each said internal server including at least one internal registration port;
  locating within the DMZ at least one reverse HTTP gateway, each said reverse HTTP gateway including a reverse proxy port configured to communicate with a client on the external network, and a proxy registration port configured to communicate with one or more internal registration ports of the at least one internal server over a substantially persistent reverse connection between the respective reverse HTTP gateway and the respective internal server; and
  establishing a common communication protocol for connections through the at least one reverse HTTP gateway, and between the external network and the internal network, the common communication protocol being a HTTP and/or HTTPS protocol,
  wherein content communicated between a client on the external network and the at least one internal server is substantially directly streamable therebetween and through the at least one reverse HTTP gateway via the common communication protocol.

19. The method of claim 18, further comprising enabling the substantially direct streaming of content between the client on the external network and the at least one internal server free from separate client configuration.

20. The method of claim 18, further comprising processing communications between the at least one reverse HTTP gateway and the at least one internal server using HTTP 1.1.

21. The method of claim 18, further comprising accommodating SOAP and/or JSP requests.

22. The method of claim 18, further comprising clustering two or more reverse HTTP gateways and clustering two or more of internal servers.

23. The method of claim 22, further comprising distributing content to the reverse HTTP gateways via a load balancer located within the DMZ; and
  selectively distributing the content to the cluster of internal servers on the part of the reverse HTTP gateways located within the cluster of reverse HTTP gateways.

24. The method of claim 23, further comprising distributing the content in dependence on a number of available connections for each of the internal servers in the cluster of internal servers and/or in dependence on a round-robin distribution of content.

25. The method of claim 18, further comprising performing username/password authentication and/or certificate-based authentication via the at least one reverse server and/or the at least one internal server.

26. The method of claim 18, further comprising providing an additional service for the at least one reverse HTTP gateway to accommodate communication via one or more additional protocols.

27. The network of claim 1, wherein the internal firewall is configured to not allow any inbound connections to be initiated through the internal firewall.

28. The HTTP gateway of claim 10, wherein the internal firewall is configured to not allow any inbound connections to be initiated through the internal firewall.

29. The method of claim 18, further comprising configuring the internal firewall to substantially prevent inbound connections from being established through the internal firewall.

30. The network of claim 1, wherein the substantially persistent reverse connection is to be initiated from the internal network.

31. The HTTP gateway of claim 10, wherein the substantially persistent reverse connection is to be initiated from the internal network.

32. The method of claim 18, further comprising initiating the substantially persistent reverse connection from a network resource in the internal network to a resource in the DMZ.

\* \* \* \* \*